Feb. 21, 1928.
H. W. BELL
1,660,030
SPRING SHACKLE LINK
Original Filed April 15, 1921
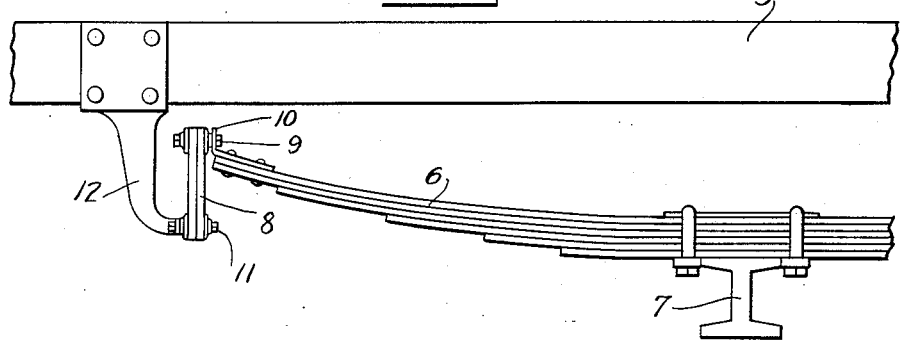
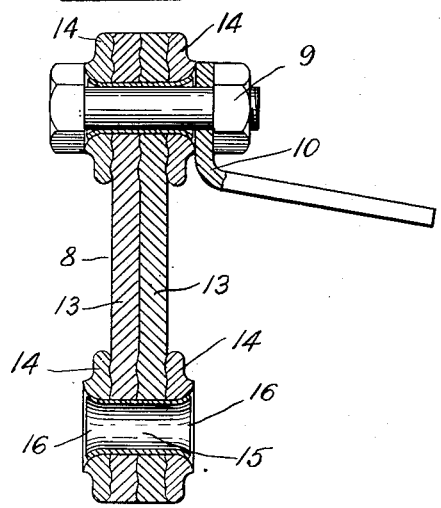
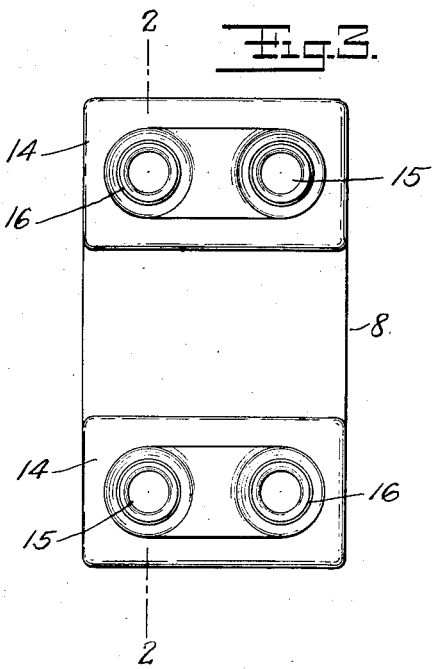
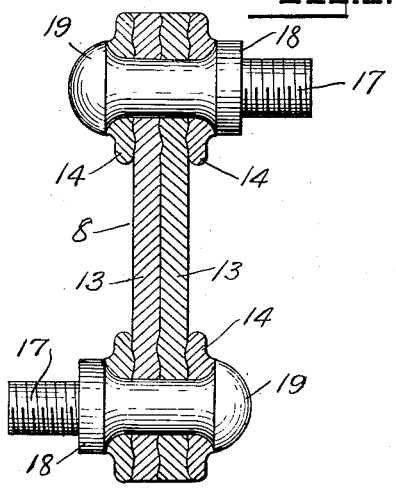
Inventor
Harvey W. Bell
By his Attorney
E. W. Marshall Patented Feb. 21, 1928.

1,660,030

UNITED STATES PATENT OFFICE.

HARVEY W. BELL, OF ARDSLEY-ON-HUDSON, NEW YORK, ASSIGNOR TO THE BELOYT CORPORATION, OF DOVER, DELAWARE, A CORPORATION OF DELAWARE.

SPRING-SHACKLE LINK.

Application filed April 15, 1921, Serial No. 461,509. Renewed June 9, 1926.

In prior applications of mine I have disclosed and claimed certain improvements in spring shackles for vehicles, wherein the related parts, such as the vehicle and frame supporting springs are connected by links of flexible material.

The present invention relates particularly to the construction of those links, the object of the invention being primarily to furnish the link in the form of a unit ready for immediate application to the vehicle.

In the accompanying drawing forming part of this specification, I have illustrated the invention embodied in two different forms, but would have it understood that other modifications are possible, without departure from the true spirit and scope of the invention as herein defined and claimed.

Figure 1 in the drawing referred to is a broken side elevation illustrating an application of the link as a suspension connection between the frame and supporting spring of a vehicle.

Figure 2 is an enlarged longitudinal sectional view of the link as taken on substantially the plane of line 2—2 of Figure 3.

Figure 3 is a side view of the link.

Figure 4 is a sectional view similar to Figure 2, illustrating another method of permanently securing the clamping plates.

In Figure 1, a portion of the frame of the vehicle is indicated at 5, one of the supporting springs is shown at 6, a part of the front axle is indicated at 7, and one of the suspension links is shown at 8, forming a connection between one end of the spring and the frame. The upper end of this suspension link is shown as secured by bolts 9 to the angularly upturned end 10 of a bracket affixed to or forming a part of the end of the spring, and the lower end of the link is shown as secured by bolts 11 to a dependent bracket 12 affixed to the frame.

The body of the link is made up, in the illustration, of a plurality of layers 13 of suitable flexible fabric, such as rubber impregnated canvas belting or the like, which is strongly resistant to flexure in its flat plane, but flexes freely in a plane at right angles thereto.

A special feature of my present and preceding inventions is that these flexible links are rigidly gripped at their ends so as to enable them to exert resistance to motion in their flat planes and so as to overcome any tendency at wearing or abrasion at the points where they are held. In this invention, the means by which the links are rigidly clamped are permanently affixed to and carried by the links, so as to form a unit therewith.

These permanently attached clamping means consist, in the illustration in each instance, of a pair of clamp plates 14 engaged with opposite faces of the link and rigidly and permanently secured together so as to fixedly clamp the material of the link therebetween. In the first form illustrated, these clamp plates are permanently secured together by tubular fastenings 15, of boiler tubing or the like, having their ends turned over, as indicated at 16, so as to operate in, effect as elongated tubular rivets. These tubular elements, in addition to their function as permanent fastenings, also provide passages for the attaching bolts 9.

In Figure 4 I have shown how the permanent fastenings and attaching bolts may be combined by providing such bolts, here designated as 17, with shoulders 18 to engage the clamp plates at one side of the link and headed over as indicated at 19 to engage and rigidly secure the clamp plates at the opposite side of the link. This construction obviates the necessity for providing separate attaching bolts and insures the links reaching the user with the bolts in place, and ready to be directly applied to the parts which are to be connected.

In applying the permanent fastenings, the clamps are compressed and held in that state while the fastening elements are being secured, the usual practice being to secure said parts in a press under a pressure of approximately four thousand pounds, and to head over the tubular sleeve or bolt fastenings while the clamps are held under such pressure. This heavy pressure brings the clamp plates into absolute firm engagement at all points of their surface with the link material, so that the links are held by the clamp plates throughout their entire areas, thus preventing any localized wear at the points where the fastenings pass through the link material, and preventing the link from dragging and stretching around the through fastenings.

This invention, it will be seen, obviates the necessity for the exercising of any special care in installing the links, it only being necessary with this invention to make sure that the attaching bolts are secure and fairly tight, it being unnecessary to apply any special pressure, because of the fact that the clamps are already set up under sufficient pressure to properly hold the links for their entire period of use.

What I claim is:

1. A link of the character disclosed comprising a substantially flat strip or strips of material substantially non-flexible in its flat plane but freely flexible at right angles thereto, independent pairs of clamp plates applied to opposite faces of the strip or strips at opposite ends of the same and means for rigidly and permanently securing together each pair of said clamp plates.

2. A link of the character disclosed comprising a substantially flat strip or strips of material substantially non-flexible in its flat plane but freely flexible at right angles thereto, independent pairs of clamp plates applied to opposite faces of the strip or strips at opposite ends of the same and means for rigidly and permanently securing together each pair of said clamp plates, and including at each pair of clamp plates, a pair of tubular members extending through the clamp plates and the interposed material and permanently headed over at their opposite ends.

3. A link unit for spring suspensions comprising a strip of flexible material and separate clamps rigidly and permanently applied to the opposite ends of the same, said clamps having means for enabling the attachment of the same to the parts to which the link is to be applied.

4. In a device of the character disclosed, a relatively flexible fabric strip, clamp plates engaged with opposite faces of said strip and means for securing said clamp plates together under heavy pressure and for holding said plates with the entire areas which face the strip, in engagement with the surfaces of the strip.

5. In a device of the character disclosed, a relatively flexible fabric strip, clamp plates engaged with opposite faces of said strip and means for securing said clamp plates together under heavy pressure and for holding said plates with the entire areas which face the strip, in engagement with the surfaces of the strip, said heavy pressure fastenings being constructed to enable the attachment of the same to a part to which the link is to be applied.

6. In combination, a vehicle supporting spring having an angularly turned end, a link unit comprising a relatively flat flexible fabric strip and separate clamps rigidly and permanently secured to the opposite ends of said strip and means for rigidly securing one end of said link unit to the angularly turned end of said spring.

7. A spring shackle link for vehicles comprising a substantially flat strip or strips of material substantially non-flexible in the flat plane but freely flexible at right angles thereto, independent pairs of clamp plates applied to opposite faces of the strip or strips and means permanently securing the clamp plates of each pair together and in fixed rigid holding engagement with the link, said means including through fastenings adapted for direct attachment to a part to which the link is to be applied.

8. A spring shackle link for vehicles comprising a substantially flat strip or strips of material substantially non-flexible in the flat plane but freely flexible at right angles thereto, a pair of clamping plates applied to opposite faces of the strip or strips, and means permanently securing the clamping plates together and in fixed rigid holding engagement with the link, said means including fastenings adapted for direct attachment to a part to which the link is to be applied.

9. A spring shackle link for vehicles comprising a substantially flat strip or strips of material substantially non-flexible in the flat plane but freely flexible at right angles thereto, a pair of rigid clamping plates permanently secured under pressure in fixed rigid holding engagement with the link at opposite sides of an end thereof, and attaching means cooperating with the clamping plates for attaching the link to the vehicle.

10. A spring shackle link for vehicles comprising a substantially flat strip or strips of material substantially non-flexible in the flat plane but freely flexible at right angles thereto, rigid clamping and reinforcing means permanently clamped under pressure against opposite faces of an end thereof, and means for securing the shackle to a vehicle.

11. The combination with a vehicle frame, of a shackle link comprising a substantially flat strip or strips of material substantially non-flexible in the flat plane but freely flexible at right angles thereto, rigid clamping plates at opposite sides of an end of the link, connecting members engaging the clamping plates and holding them in assembled relation independently of the spring, and means cooperating with the connecting members for securing the shackle to the spring.

12. The combination with a vehicle frame, of a shackle link comprising a substantially flat strip or strips of material substantially non-flexible in the flat plane but freely flexible at right angles thereto, rigid clamping plates at opposite sides of an end of the link, connecting members engaging the clamping plates and holding them in assembled relation independently of the spring, and means cooperating with the connecting members for securing the shackle to the spring, and arranged by such cooperation to increase the pressure of the clamping plates upon the link.

13. The combination with a vehicle frame, of a shackle link comprising a substantially flat strip or strips of material substantially non-flexible in the flat plane but freely flexible at right angles thereto, rigid clamping plates at opposite sides of an end of the link, tubular rivets extending through the clamping plates and headed over to secure the plates permanently to the links under pressure, said rivets being short enough to terminate within the bounds of the clamping plates, connecting members passed through said rivets for securing the shackle to the spring, and means cooperating with the connecting members for securing the shackle to the spring and for applying pressure to the clamping plates.

In witness whereof, I have hereunto set my hand this 11 day of April, 1921.

HARVEY W. BELL.